United States Patent [19]

Poeppelmeier et al.

[11] Patent Number: 4,568,656

[45] Date of Patent: Feb. 4, 1986

[54] PROCESS FOR LOADING PLATINUM INTO ZEOLITE-L

[75] Inventors: Kenneth R. Poeppelmeier, Flemington; Theodore D. Trowbridge, Madison, both of N.J.; Jar-Lin Kao, Houston, Tex.

[73] Assignee: Exxon Research & Engineering Co., Florham Park, N.J.

[21] Appl. No.: 679,495

[22] Filed: Dec. 7, 1984

[51] Int. Cl.$^4$ .................. B01J 29/32; B01J 29/22; B01J 29/12

[52] U.S. Cl. .................................. 502/74; 502/66

[58] Field of Search ........................ 502/66, 74

[56] References Cited

U.S. PATENT DOCUMENTS

| | | | |
|---|---|---|---|
| 3,226,339 | 12/1965 | Frillette et al. | 252/455 |
| 3,775,502 | 11/1973 | Oishi | 260/673.5 |
| 3,832,414 | 8/1974 | Oishi | 260/673.5 |
| 3,925,254 | 12/1975 | Oishi | 252/455 Z |
| 3,953,365 | 4/1976 | Oishi | 252/455 Z |
| 4,104,320 | 8/1978 | Bernard et al. | 260/673.5 |
| 4,416,806 | 11/1983 | Bernard et al. | 502/74 |
| 4,458,025 | 7/1984 | Lee et al. | 502/66 |

FOREIGN PATENT DOCUMENTS 2096481 10/1982 United Kingdom .
2116450 9/1983 United Kingdom .

OTHER PUBLICATIONS

Y. W. Chen et al., Effect of Preparation Methods on the Catalytic Properties of Zeolite-Supported Ruthenium in the Fischer-Tropsch Synthesis, Journal of Catalysis, 83, 415–427 (1983).

*Primary Examiner*—Carl F. Dees
*Attorney, Agent, or Firm*—M. D. Bittman; J. J. Mahon

[57] ABSTRACT

A process is provided for loading and uniformly distributing platinum onto a Zeolite-L. The Zeolite-L is contacted with an aqueous solution containing a platinum salt and a non-platinum metal salt, wherein the non-platinum metal salt is present in solution in an amount which is critical to preventing the formation of acid sites as well as avoiding an excess of metal ions in the form of a salt which could block the pores of the Zeolite-L. The Zeolite-L is then aged to allow the platinum to migrate and uniformly distribute throughout the Zeolite.

20 Claims, 1 Drawing Figure

PROCESS FOR LOADING PLATINUM INTO ZEOLITE-L

BACKGROUND OF THE INVENTION

This invention relates to depositing platinum onto a zeolite carrier. More particularly this invention provides a process for loading and uniformly distributing platinum into a Type L Zeolite by ion exchange. Platinum loaded Zeolite-L thus prepared is especially useful as a catalyst, particularly in the dehydrocyclization of paraffins into aromatic compounds.

Zeolite-L, particularly the potassium exchanged form of Zeolite-L, is a non-acidic carrier and in order to obtain its unique catalytic properties after platinum loading, particularly its unique dehydrocyclization capabilities, it is important that the zeolite remain non-acidic, and that acidic sites not be generated due to the platinum loading procedures. In addition, in order to enhance the performance of the platinum loaded Zeolite-L catalyst, a uniform distribution of platinum throughout the Zeolite-L is important. Another important requirement includes carrying out the loading procedure without leaving excess salt or ions in the zeolite pores which could lead to undesirable obstruction and a consequent reduction of catalytic activity. In addition, since it is commercially desirable to load a bound form of the Zeolite-L in the form of a pellet, the loading should be carried out in a manner so as not to cause excessive attrition of the pellets when processed in large quantities. Further, the loading must be carried out in a manner which is suitable for commercial scale operations.

The two basic methods of loading platinum into a zeolite carrier using an aqueous platinum solution are the impregnation and ion exchange techniques. The impregnation technique of loading platinum into a zeolite carrier generally involves loading with an amount of cationic platinum solution of a volume only sufficient to fill the total pore volume of the carrier to incipient wetness (saturation). In contrast, the ion-exchange technique involves loading platinum into a zeolite carrier with an amount of cationic platinum solution in excess of that needed to fill the total pore volume of the carrier to incipient wetness. The excess solution is stirred with or circulated through the bed of zeolite particles. In both cases there is a rapid decrease in the concentration of platinum ions to a minimum and an equivalent increase of the non-platinum cations in solution due to the ability of the zeolite to incorporate other cations via ion-exchange with the non-framework metal ions of the zeolite. Completion of the catalyst preparation consists of drying and calcination of the solids. In the case of impregnation the solids are dried and calcined directly, whereas in the case of the ion-exchange technique the excess liquid is removed from the solids prior to drying and calcination. As shown in U.S. Pat. No. 4,104,320, the ion exchange process may result in residual acidity when, during the subsequent reduction of the platinum cations which are now near atomic dispersion inside the zeolite channels, hydrogen ions are formed in order to maintain charge neutrality of the zeolite structure. The acidity occurs because a large fraction of the non-framework cations that were displaced by platinum cations during loading is removed in the discarded excess liquid prior to drying and calcination. Subsequently, when the platinum is reduced using hydrogen-containing reducing agents these cations are no longer available to displace protons from these sites. The formation of acid sites is not a problem with the impregnation technique since the displaced ion will remain on the carrier so that when the platinum is subsequently reduced the original displaced ion can replace the proton on these sites. Impregnation would appear to be the desired technique for loading a non-acidic carrier such as the Zeolite-L which needs to remain non-acidic. However, in order to achieve uniform contacting of large quantities of the carrier with the cationic platinum solution during the use of the impregnation technique it becomes necessary to expose the Zeolite-L pellets to inordinant mechanical stress as the result of mixing and tumbling, and as a result, excessive attrition is caused in this type of operation.

U.S. Pat. No. 4,416,806 also is said to disclose the depositing of platinum on a Zeolite L carrier by impregnation and exchange of ions. Also disclosed is that the carrier is immersed in a solution containing platinum for a period of time, washed and dried, and that ion exchange and impregnation may be carried out in the presence of an excess of salt of the cation of the zeolite; for instance, potassium chloride for the KL Zeolite. In U.S. Pat. No. 3,226,339 an aluminosilicate zeolite is contacted with a solution of an ionizable platinum compound and an ionizable non-platinum metal salt for a sufficient period of time said to effect uniform distribution of the platinum ion on the zeolite. While both of these patents discuss the presence of an excess of a metal salt, there is no disclosure of the particular process which is necessary to prevent acid site generation upon the drying, calcination and reduction of the zeolite carrier while avoiding an excess of metal ions in the form of a salt which could block the passage of hydrocarbons through the pores of the zeolite carrier.

In U.S. Pat. No. 3,775,502 Zeolite X is mixed in an ion exchange procedure with a platinum salt and a sodium salt for several hours. Thereafter, the catalyst is washed thoroughly to remove the salt residue and then dried. Excessive water washing at this stage can cause other undesirable reactions, such as the loss of platinum from the carrier and incorporation of acidity into the carrier. Upon reduction the catalyst is given a final treatment of aqeuous sodium bicarbonate salt to convert the $H^+$ zeolite sites which have been created (also see U.S. Pat. No. 3,953,365).

SUMMARY OF THE INVENTION

In brief, the invention involves a process for loading and uniformly distributing platinum onto a Zeolite-L by contacting the Zeolite-L with an aqueous loading solution containing a platinum salt and a soluble non-platinum metal salt. The quantity of non-platinum metal salt in the loading solution is critical in assuring that acid sites will not be formed on the catalyst during subsequent drying, calcination and reduction. In addition, the quantity of non-platinum metal salt in the loading solution avoids an excess of metal ions in the form of a salt which could block the passage of hydrocarbons through the pores of the zeolite.

The amount of loading solution to be used (defined as Z) is in excess of that which is required to fill the total pore volume of the carrier to incipient wetness (defined as X, where Z is always greater than X). The amount of non-platinum metal salt (defined as A) is initially present in combination with the platinum source in the loading solution such that after loading, the initial amount of non-platinum metal salt (A) plus the amount of non-platinum metal salt added to the solution by ion-exchange between the platinum source and the zeolite (defined as $A^1$) is present in the loading solution (Z) in a concentration $((A+A^1)/Z)$ equal to the concentration $(A^1/X)$ of non-platinum metal salt added to the solution by ion-exchange between the platinum source and the zeolite at incipient wetness within a range:

$$\frac{A + A^1}{Z} = \frac{0.3\, A^1}{X} \text{ to } \frac{1.2\, A^1}{X}$$

The excess liquid is removed from the carrier and the solids are subsequently aged for a time and temperature effective to allow the platinum to migrate and uniformly distribute throughout the zeolite. The aged zeolite is then dried and calcined, and subsequently activated by reduction to form the active catalyst.

DETAILED DESCRIPTION OF THE INVENTION

Figure 1:
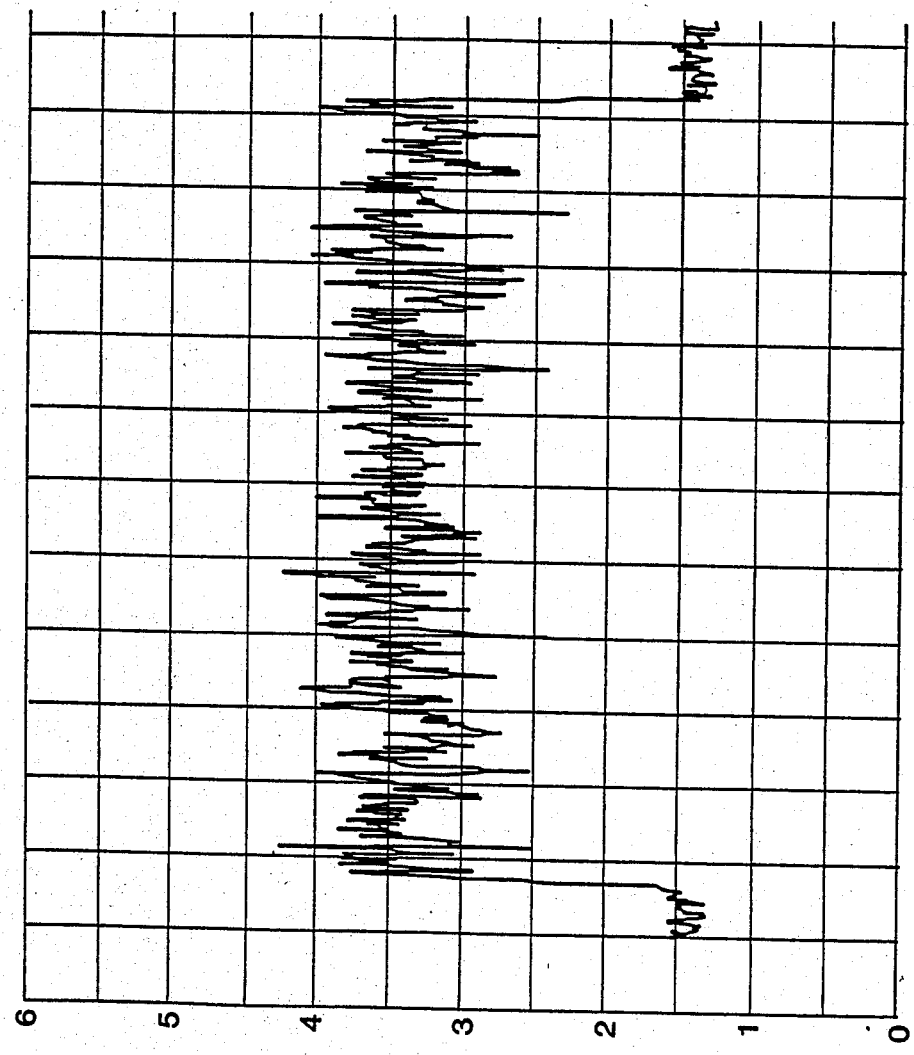
FIG. 1 is a reproduction of an XRF (microprobe) spectrum showing the platinum distribution across a bound Zeolite-L pellet loaded by the process of this invention.

The process of this invention for loading the platinum onto the Zeolite-L utilizes the ease of application of the ion exchange method which uses excess solution circulating through and over the zeolite solid, and controls the solution's concentration of metal ions to be essentially equal to that existing in the impregnation method. As a result excess acidity is not introduced into the zeolite during the reduction of the platinum ion and the need for washing with aqueous alkaline solutions is eliminated. Further, there are no excess displaced non-platinum metal ions left over in the form of a salt to clog the zeolite or catalyst channels after the catalyst preparation has been completed. In addition, sufficient metal ions are present in the solution found within the Zeolite-L during the aging step to allow the platinum ion to migrate and thereby ensure uniform platinum distribution throughout the Zeolite-L. The term carrier as used herein, refers to any form of Zeolite-L which is to be loaded with platinum, whether it is a Zeolite-L powder or a bound Zeolite-L in the form of a pellet.

A description of Zeolite-L is given in U.S. Pat. No. 3,216,789 and its use in the hydrocyclization of aliphatic hydrocarbons is described in U.S. Pat. No. 4,104,320, both patents being incorporated herein by reference.

The process for loading platinum involves contacting the Zeolite-L with an aqueous solution containing a platinum salt and a soluble non-platinum metal salt. The amount of loading solution (defined as Z) is in excess of that which is required to fill the total pore volume of the carrier to incipient wetness (defined as X). As applied here, the quantity X is determined by experiment and does not differentiate between the liquid incorporated into the macro-micropores and the intrazeolite channels of the carrier. The excess of solution over that which the carrier can adsorb enables all of the Zeolite-L particles or pellets to be uniformly wetted with the aqueous solution. The presence of an excess of solution permits the loading process to be used on any scale without having to expose the Zeolite-L to excess attrition as a result of mixing, tumbling and other techniques to achieve uniform wetting, which may be needed in other methods such as in the impregnation technique. The Zeolite-L, preferably in the form of pellets, can be placed in a loading tank with the excess aqueous solution circulating through and over the Zeolite-L in order to achieve uniform wetting and thus uniform loading of platinum into the Zeolite-L. The excess of solution is not limited to any specific amount except that which may be used in a commercial loading process, such as a large-scale, fixed bed loading process.

The soluble platinum salt contains a complex having a platinum cation in the plus two oxidation state. This salt may be one or more of a number of water soluble platinum salts including tetraamine platinum (II) chloride monohydrate, tetraamine platinum (II) nitrate, diamine platinum (II) nitrite or dichlorobis (acetonitrile) platinum (II). Substantially all (i.e. at least 90–95%) of the platinum from the solution is adsorbed onto the Zeolite-L, provided less than about 10% of platinum by weight of the Zeolite is to be loaded on the Zeolite-L. Generally, about 0.1 to 5%, preferably 0.3 to 1.5% of platinum by weight of the zeolite is loaded onto the Zeolite-L.

The amount of non-platinum metal salt (defined as A) is initially present in combination with the platinum source in the loading solution such that after loading, the initial amount of non-platinum metal salt (A) plus the amount of non-platinum metal salt added to the solution by ion-exchange between the platinum source and the zeolite (defined as $A^1$) is present in the loading solution (Z) in a concentration $((A+A^1)/Z)$ equal to the concentration $(A^1/X)$ of non-platinum metal salt added to the solution by ion-exchange between the platinum source and the zeolite ($A^1$) at incipient wetness (X) within a range:

$$\frac{A + A^1}{Z} = \frac{0.3\, A^1}{X} \text{ to } \frac{1.2\, A^1}{X}$$

This critical balance of the cations prevents the creation of acid sites within the zeolite caused by metal ion migration out of the zeolite into the surrounding solution and being replaced on the substrate by protons upon reduction of the platinum or the clogging of zeolite pores by the presence of excess non-platinum metal ions in the form of a salt, after the drying, calcining and reduction steps. In addition, this balance of non-platinum metal ions in solution provides sufficient ion mobility to allow platinum migration to occur during the aging step and therefore establish a uniform platinum profile throughout each Zeolite-L particle or pellet. The critical balance of cation concentration ranges from $0.3A^1/X$ to $1.2(A^1/X)$, and preferably ranges from $0.5A^1/X$ to $1.0A^1/X$ to prevent acid site creation and prevent the clogging of zeolite pores. The amounts as used in the above equation may involve any consistent unit of quantity (e.g., moles, pounds, grams, etc.).

The aqueous loading solution is carefully formulated by control of the non-platinum metal ion content to minimize any change in the concentration of metal ions in the liquid volume required to fill the total pore volume of the carrier to incipient wetness after the platinum ion concentration reaches an equilibrative minimum. Ideally, this change in non-platinum metal-ion concentration should approach zero. In practice, however, a change up to about $-70\%$ to $+20\%$ is permissable while still obtaining the uniform catalyst of this invention.

The non-platinum metal salt concentration and, consequently, the non-platinum metal cation concentration of the loading solution depends, in part, upon the amount of platinum salt in the aqueous solution since for each platinum ion actually ion exchanged with the Zeolite-L an equivalent of two potassium ions are generated and thus the metal salt concentration must be adjusted accordingly. In this way excess acidity is not introduced into the zeolite when the platinum is subsequently reduced, nor are any excess displaced ions left to clog the channels in the form of a salt after catalyst preparation has been completed. Further, sufficient non-platinum metal cations remain within the carrier during the aging step to enable the platinum to migrate uniformly throughout the Zeolite-L particle or pellet.

The non-platinum metal salt which is added to the aqueous loading solution along with the platinum salt is readily soluble in an aqueous solution. The metal salt may contain one or more cations such as lithium, sodium, potassium, rubidium, cesium, magnesium, calcium, strontium and barium and may include an anion such as a hydroxide or nitrate, or a halide such as a chloride or bromide. In a preferred embodiment, the cation of the non-platinum metal salt is the same as the exchangeable cation contained in the Zeolite-L, so the exchangeable cation of the Zeolite-L is not diluted by exchange with the cation of the metal salt. The preferred metal salt cation and exchangeable cation in the Zeolite-L is potassium since a platinum loaded potassium Zeolite-L catalyst has exhibited desirable catalytic activity especially in a dehydrocyclization process.

The contacting of the loading solution with the Zeolite-L is generally carried out at temperatures ranging from room temperature to 100° C. The aqueous loading solution should have a pH such that loading is facilitated and acidity is not introduced into the Zeolite-L. Generally, the solution will have a pH of at least 7, preferably 8.5 to 12.5.

In a preferred embodiment the Zeolite-L is in the form of a pellet. The term pellet is meant to include both tablets and extrudates with or without a binder. In some cases where a binder, such as alumina and/or silica, is used which is acidic or has intrinsic ion exchange capacity, it may be necessary to adjust the amount of the non-platinum metal cation in the loading solution to compensate for this capacity.

In the initial contacting step the platinum ions are concentrated near the surface of the Zeolite-L crystallites. After the platinum ion concentration reaches an equilibrative minimum, the next critical step of the loading process involves aging the Zeolite-L which contains the aqueous solution for a time and a temperature effective to allow the platinum to migrate and uniformly distribute throughout the Zeolite-L. Excess solution is drained prior to aging to facilitate handling. The aging step is facilitated by the metal cation balance within the Zeolite-L since the balance allows the platinum to redistribute itself across the Zeolite-L particle or pellet cross section and establish a uniform platinum profile. See FIG. I which shows the uniform platinum distribution achieved by this process. While aging may be carried out at ambient temperatures, the migration is enhanced by maintaining a moderately elevated temperature of 25° to 100° C. Most preferably, aging is carried out at a temperature of at least 50° C. for one to 72 hours. Carrying out the ion-exchange of the contacting step in the absence of metal cation balance for a long period of time is not a substitute for the aging step as it has been observed that even after contacting for 72 hours, in the absence of a metal cation balance the platinum still remains concentrated near the surface of the particle or pellet, while contact with the loading solution for 1½ hours and aging with a balance of metal cations at 50° C. for 3 days results in a uniform platinum distribution.

The aged Zeolite-L is then dried under conditions which do not disrupt the uniform platinum distribution and generally involves drying at temperatures of 50° to 200° C. for 2 to 24 hours. This step generally involves a slow drying to prevent steaming and platinum agglomeration. Generally, the temperature of the Zeolite-L is gradually increased over time to dry the Zeolite-L. For example, this can involve drying over a period of 8 hours while gradually increasing the temperature in 50° increments from 50° C. to 200° C. Generally, the Zeolite-L is dried to a moisture content of 1 to 10%, preferably 1 to 2% by weight of the Zeolite-L.

This loading process is preferably carried out without a washing step between the contacting, aging and drying steps. Thus, the loss of non-platinum metal ions which can cause residual acidity and the loss of platinum which can increase costs can be avoided.

The dried Zeolite-L is then preferably calcined. The calcination is carried out under conditions which minimize platinum agglomeration. Calcination is generally carried out at 200° to 550° C., preferably 350° to 500° C.

In order to activate the catalyst a hydrogen reduction is carried out to reduce the exchanged platinum cation to the metallic state. During reduction the non-platinum cations present within the carrier are available to fill the cation sites in the Zeolite-L structure without adding acidity to the Zeolite-L and without leaving excess metal cations in the zeolite pores which could lead to undesirable obstructions and thus a less active catalyst. In general, hydrogen reduction is carried out at temperatures ranging from room temperature to 510° C., preferably 350° to 510° C.

EXAMPLE 1

100 grams of 1/16 inch extrudate containing 30% by weight alumina and 70% by weight potassium Zeolite-L were dried to less than 1 wt% water. The liquid volume required to saturate the total pore volume of the carrier was 0.56 ml per gram of extrudate. The loading solution was made by combination of 170 ml H$_2$O, 1.628 g of Pt(NH$_3$)$_4$Cl$_2$·H$_2$O (56.3 wt% Pt) and 1.494 g KCl. An additional 5 ml of 2M KOH was added to compensate for the presence of the alumina phase and this was not used in the calcination that follows. The extrudate was added to the loading solution which was then continuously circulated for 75 minutes. Thus, at the end of this time:

$$X = 0.56 \times 100 = 56 \text{ ml}$$

and assuming essentially complete ion-exchange of Pt $$A' = \frac{1.628 \times 0.563}{195.09} \times 2 = 9.4 \times 10^{-3} \text{ moles K}^+$$

$$Z = 175 \text{ ml}$$

$$A = \frac{1.494}{74.6} = 20.0 \times 10^{-3} \text{ moles K}^+$$

$$\frac{A + A'}{Z} = \frac{A'}{X} = .168 \text{ moles/liter}$$

The wet extrudate was removed from the loading solution and aged at 50° C. for 72 hours in a closed container, at which time the platinum was distributed uniformly through the extrudate as shown in FIG. 1.

The extrudate was next dried and calcined at 110° C. for 16 hours, 200° C. for 2 hours, and 350° C. for 3 hours. The dried and calcined catalyst was reduced by hydrogen in situ during the reactor start-up between 100° C. and 510° C. The resultant catalyst contained 1.30% Pt by weight of zeolite.

The catalyst was then used in a reforming process under the following conditions: n-hexane feed; 510° C.; 100 psig; weight hourly space velocity of 2.5 g/hr/g; and at a hydrogen to oil mole ratio of six. The resultant $C_6$ conversion, benzene yield and benzene selectivity are as follows:

EXAMPLE #1
Wt. % on Feed

| Operating Time (Hrs) | $C_6$ Conversion (Wt. %) | Benzene Yield (Wt. %) | Benzene Selectivity |
|---|---|---|---|
| 4.0 | 99.04 | 53.57 | 54.09 |
| 24.0 | 98.62 | 58.52 | 59.33 |
| 44.0 | 98.44 | 58.64 | 59.56 |
| 64.0 | 98.08 | 58.88 | 60.03 |
| 84.0 | 97.92 | 58.35 | 59.60 |
| 104.0 | 97.62 | 57.77 | 59.18 |

EXAMPLE 2

44.96 grams of 1/16 inch extrudate containing 30% by weight silica and 70% by weight potassium Zeolite-L were dried to less than 1 wt.% water. The liquid volume required to saturate the total pore volume of the carrier was 0.57 ml per gram of extrudate. The loading solution was made by combination of 80 ml $H_2O$, 0.733 g of $Pt(NH_3)_4Cl_2 \cdot H_2O$ (56.3 wt% Pt) and 0.670 g KCl. The extrudate was added to the loading solution which was then continuously circulated for 75 minutes. Thus at the end of this time:

$X = 0.57 \times 44.96 = 25.6$ ml and assuming essentially complete ion exchange of Pt $A' = \frac{0.733 \times .563}{195.09} \times 2 = 4.23 \times 10^{-3}$ moles K$^+$ $Z = 80$ ml $A = \frac{0.67}{74.6} = 8.98 \times 10^{-3}$ moles K$^+$ $\frac{A + A'}{Z} = \frac{A'}{X} = 0.165 \frac{\text{moles K}^+}{\text{liter}}$ The wet extrudate was removed from the loading solution and aged at 50° C. for 72 hours in a closed container, at which time the platinum was distributed uniformly through the extrudate.

The extrudate was next dried and calcined at 110° C. for 16 hours, 200° C. for 2 hours, and 350° C. for 3 hours. The dried and calcined catalyst was reduced by hydrogen in situ during the reactor start-up between 100° C. and 510° C. The resultant catalyst contained 1.30% Pt by weight on zeolite.

The resultant catalyst was then used in a reforming process under the following conditions: n-hexane feed; 510° C.; 100 psig; weight hourly space velocity of 2.5 g/hr/g; and at a hydrogen to oil mole ratio of six. The resultant $C_6$ conversion, benzene yield and selectivity are as follows:

EXAMPLE #2
Wt % on Feed

| Operating Time, Hrs. | $C_6$ Conversion (wt %) | Benzene Yield (Wt %) | Benzene Selectivity |
|---|---|---|---|
| 4.0 | 98.44 | 58.85 | 59.78 |
| 24.0 | 97.94 | 65.17 | 66.54 |
| 44.0 | 97.48 | 62.65 | 64.27 |
| 64.0 | 97.71 | 64.18 | 65.68 |
| 84.0 | 97.34 | 64.78 | 66.55 |
| 104.0 | 97.00 | 63.25 | 65.21 |

EXAMPLE 3

A potassium Zeolite-L containing 70% by weight of Zeolite-L and 30% by weight of silica in the form of 1/16 inch extrudate was dried. The liquid volume required to saturate the total pore volume of the carrier was 0.596 ml per gram of extrudate. The extrudate at a level of 11.172 grams was added to 13.6059 g of solution containing 0.1647 grams of $Pt(NH_3)_4Cl_2 \cdot H_2O$ (56.3 wt% Pt) and 13.4412 grams of 0.269 wt% aqueous KCl solution to provide a by weight ratio of $H_2O$/extrudate of 1.22. The mixture was allowed to stand at room temperature for 2 hours with occasional shaking. Thus at the end of this time:

$X = 0.596 \times 11.172 = 6.66$ ml and assuming essentially complete ion exchange of Pt $A' = \frac{.1647 \times .563}{195.09} \times 2 = 0.951 \times 10^{-3}$ moles K$^+$ $Z = 13.405$ ml $A = \frac{.0362}{74.6} = 0.485 \times 10^{-3}$ moles K$^+$ $\frac{A + A'}{Z} = (0.75) \frac{A'}{X} = 0.107 \frac{\text{moles K}^+}{\text{liter}}$ The excess liquid was removed and the wet solid was aged at 50° C. for 48 hours, followed by drying at 110° C. for 4 hours to a moisture content of 8% by weight. The resultant catalyst contained 1.17% Pt by weight on zeolite which was uniformly distributed throughout the Zeolite-L.

The dried catalyst precursor was reduced by hydrogen in situ during the reactor start-up between 100° C. and 510° C.

The catalyst was used in a reforming process under the following conditions: n-hexane feed; 510° C.; 100 psig; weight hourly space velocity of 2.5 g/hr/g; and at a hydrogen to oil mole ratio of 6. The resultant $C_6$ conversion, benzene yield and benzene selectivity are as follows:

| Operating Time (hrs) | $C_6$ Conversion (Wt %) | Benzene Yield (Wt %) | Benzene Selectivity |
|---|---|---|---|
| 3.0 | 98.4 | 60.6 | 61.6 |
| 23.5 | 96.6 | 66.3 | 68.6 |
| 46.1 | 95.5 | 66.2 | 69.3 |
| 69.3 | 93.3 | 65.6 | 69.9 |
| 90.8 | 92.8 | 64.9 | 69.9 |
| 119.8 | 91.8 | 64.5 | 70.3 |

-continued

| Operating Time (hrs) | C$_6$ Conversion (Wt %) | Benzene Yield (Wt %) | Benzene Selectivity |
|---|---|---|---|
| 141.8 | 90.5 | 63.0 | 69.3 |

What is claimed is:

1. A process for loading and uniformly distributing platinum onto a Zeolite-L containing exchangeable non-platinum metal cations comprising:

contacting the Zeolite-L with an aqueous solution containing a platinum salt and a soluble non-platinum metal salt with the amount of solution being in excess of that which the Zeolite-L can absorb, where the platinum salt contains a platinum cation in the +2 state, and the non-platinum metal salt is initially present in the solution in an amount defined by the formula:

$$\frac{A + A^1}{Z} = \frac{0.3 A^1}{X} \text{ to } \frac{1.2 A^1}{X}$$

wherein A is the amount of non-platinum metal cations initially present in the solution, $A^1$ is the amount of a non-platinum metal cation added to the solution by ion-exchange between the platinum cation and the Zeolite-L, Z is the amount of the solution added to the Zeolite-L and X is an amount of a solution which is required to fill the total pore volume of the Zeolite-L to incipient wetness; and aging the Zeolite-L containing the aqueous solution for a time and at a temperature effective to allow the platinum to migrate and uniformly distribute throughout the Zeolite-L.

2. Process of claim 1 wherein the non-platinum metal salt is initially present in solution in an amount defined by the formula:

$$\frac{A + A^1}{Z} = \frac{0.5 A^1}{X} \text{ to } \frac{1.0 A^1}{X}.$$

3. Process of claim 1 wherein the contacting is carried out at temperatures in the range of room temperature to 100° C. and the aqueous solution is at a pH of at least 7.

4. Process of claim 1 wherein the Zeolite-L prior to loading contains an exchangeable metal cation chosen from the group consisting of lithium, sodium, potassium, rubidium, cesium, magnesium, calcium, strontium and barium.

5. Process of claim 4 wherein the metal salt contains a cation chosen from the group consisting of lithium, sodium, potassium, rubidium, cesium, magnesium, calcium, strontium and barium, and an anion chosen from the group consisting of chloride, hydroxide, bromide and nitrate.

6. Process of claim 5 wherein the cation of the metal salt is the same as the exchangeable cation contained in the Zeolite-L.

7. Process of claim 6 wherein the Zeolite-L contains potassium as the exchangeable cation and the metal cation is potassium.

8. Process of claim 1 wherein the excess solution is drained and the Zeolite-L is then aged.

9. Process of claim 1 wherein the platinum salt is chosen from the group consisting of tetraamine platinum (II) chloride monohydrate, tetraamine platinum (II) nitrate, diamine platinum (II) nitrite or dichloro bis(acetonitrile) platinum (II).

10. Process of claim 1 wherein the amount of platinum is within the range of 0.3 to 1.5% by weight of the Zeolite-L.

11. Process of claim 1 additionally comprising the steps of slowly drying the Zeolite-L to minimize steaming and platinum agglomeration.

12. Process of claim 11 further comprising calcining the dried Zeolite-L.

13. Process of claims 11 or 12 further comprising subsequently reducing the Zeolite-L in a hydrogen atmosphere.

14. Process of claim 1 wherein the Zeolite-L is in the form of a pellet.

15. Process of claim 14 wherein the pellet comprises Zeolite-L and a binder.

16. Process of claim 15 wherein the contacting is carried out with a minimum of agitation to avoid attrition of the pellet.

17. Process of claim 15 wherein the binder is acidic or has ion exchange capacity and the amount of metal cation in the aqueous solution is adjusted to compensate for this capacity.

18. Process of claims 2, 15 or 17 wherein the aqueous solution is at a pH between 8.5 and 12.5.

19. Process of claims 1 or 8 wherein aging is carried out at 25° to 100° C. for 1 to 72 hours.

20. Process of claim 11 wherein drying is carried out at 50° to 200° C. for 2 to 24 hours.

* * * * *